Nov. 1, 1938.　　　B. S. AIKMAN　　　2,135,247
COMPRESSOR VALVE CONTROL
Filed May 26, 1936　　　3 Sheets-Sheet 2
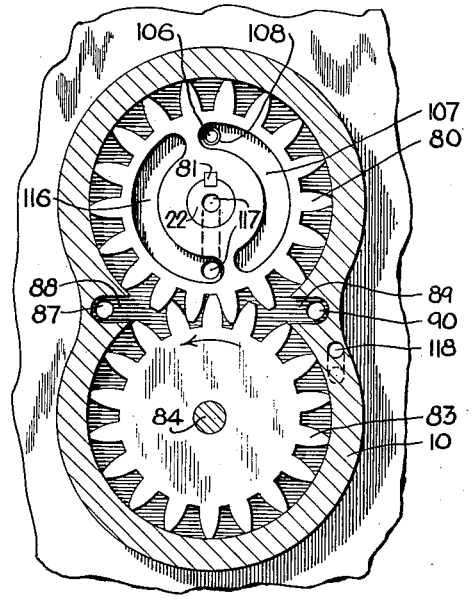
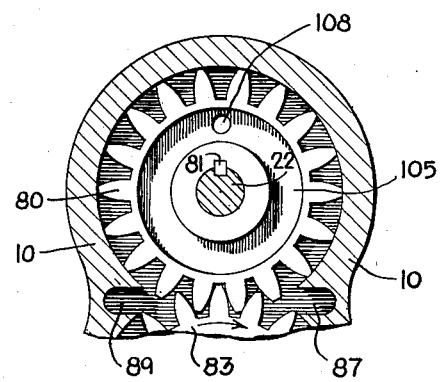
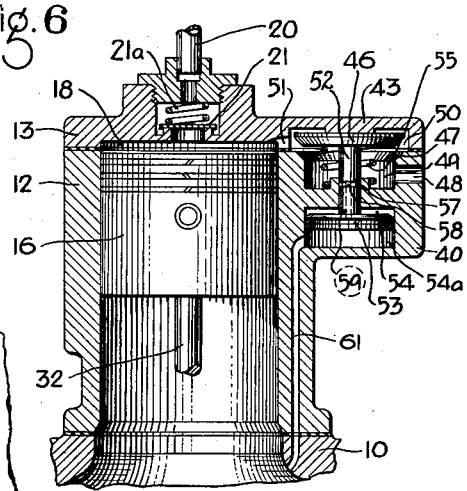
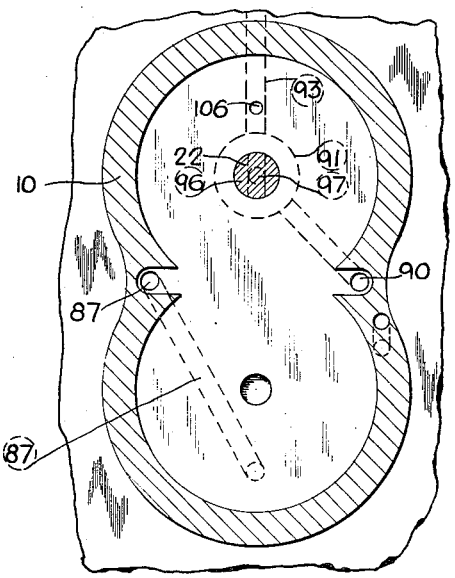
INVENTOR
BURTON S. AIKMAN
BY Wm. M. Cady
ATTORNEY Nov. 1, 1938.   B. S. AIKMAN   2,135,247
COMPRESSOR VALVE CONTROL
Filed May 26, 1936   3 Sheets-Sheet 3
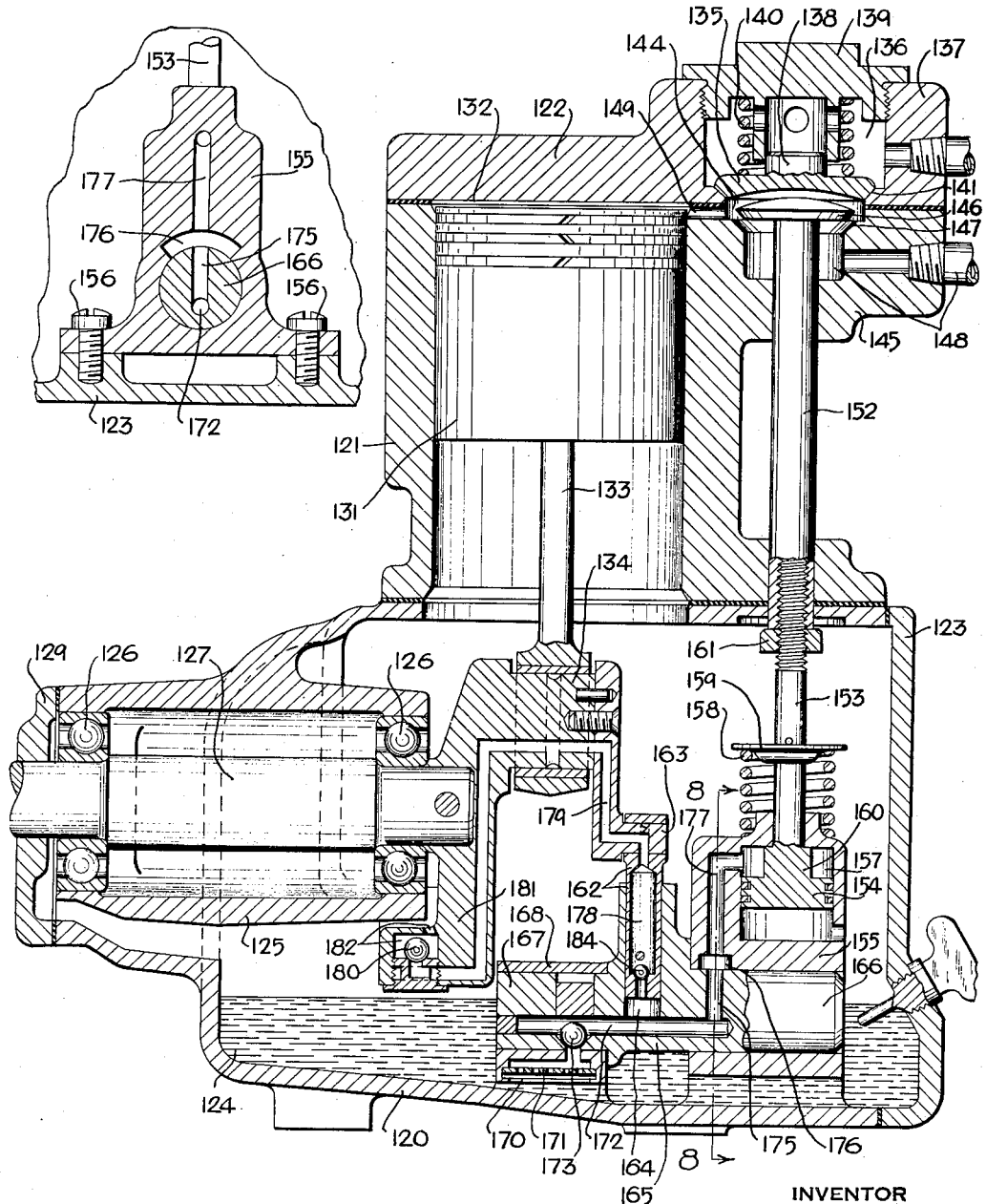
INVENTOR
BURTON S. AIKMAN
BY Wm. N. Cady
ATTORNEY Patented Nov. 1, 1938

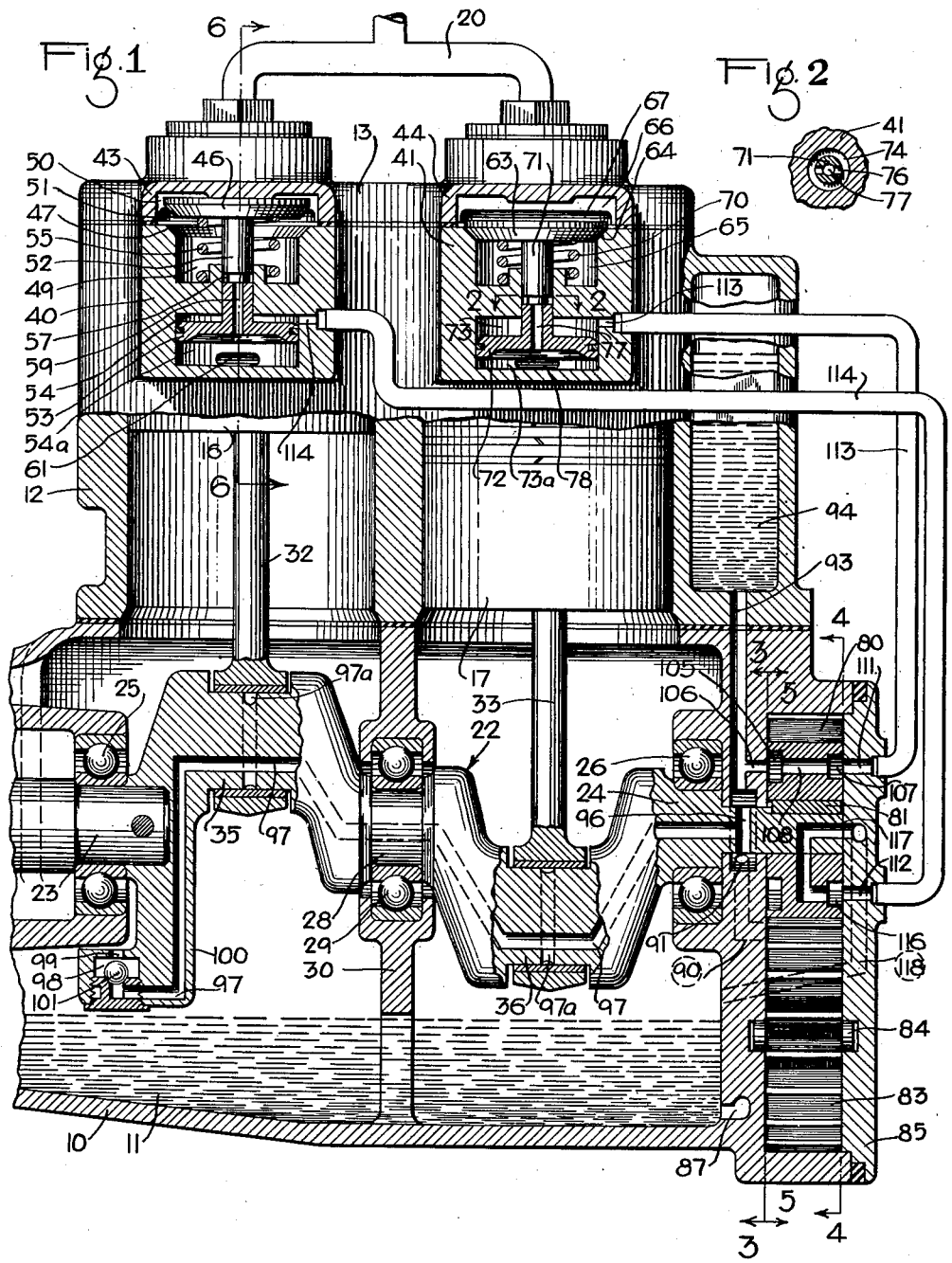

2,135,247

UNITED STATES PATENT OFFICE 2,135,247

COMPRESSOR VALVE CONTROL

Burton S. Aikman, Wilkinsburg, Pa., assignor to The Westinghouse Air Brake Company, Wilmerding, Pa., a corporation of Pennsylvania Application May 26, 1936, Serial No. 81,861

7 Claims. (Cl. 230—29)

This invention relates to fluid compression apparatus, and more particularly to means for controlling the operation of valves in a fluid compressor or the like.

The principal object of my invention is to provide an improved fluid compressor having an inlet valve actuated by a movable abutment subject to the pressure of the fluid in a chamber, and incorporating means for regulating the supply and release of fluid under pressure to and from this chamber in timed relation to operation of the compressor.

Another object of the invention is to provide means controlled by the pressure of lubricant in a pressure lubricating system of a compressor for positively operating the inlet valve or valves in accordance with the speed of the compressor, so as to effect operation thereof with maximum efficiency, and adapted to effect unloading of the compressor while operating at a speed below a predetermined rate.

A further object of my invention is to provide pressure responsive means controlled by fluid lubricant in the pressure lubricating system of a compressor having one or more fluid compressing pistons, for operating the inlet valves of the compressor, and distributor means operative to control the supply fluid lubricant under pressure to the pressure responsive means of each inlet valve so as to effect the operation of said inlet valves in timed relation to the operation of the respective pistons and said compressor.

Another object of my invention is to provide an improved fluid compressor.

Other objects of the invention and features of novelty will be apparent from the following description, taken in connection with the accompanying drawings, in which:

Fig. 1 is a vertical sectional view of a multi-cylinder compressor embodying one form of my invention; Fig. 2 is a sectional view taken substantially on the line 2—2 of Fig. 1; Fig. 3 is a view of a portion of the compressor casing taken substantially on the line 3—3 of Fig. 1; Fig. 4 is a sectional view of the lubricant pump, taken substantially on the line 4—4 of Fig. 1; Fig. 5 is a sectional view of a portion of said lubricant pump taken substantially on the line 5—5 of Fig. 1; Fig. 6 is a reduced sectional view of the cylinder portion of the compressor taken substantially on the line 6—6 of Fig. 1; Fig. 7 is a vertical sectional view of a compressor embodying another form of my invention; and Fig. 8 is a sectional view taken substantially on the line 8—8 of Fig. 7.

Referring to Figs. 1 to 6 of the drawings, one form of the invention is shown associated with a compressor of the multi-cylinder type, which comprises a crank case 10 containing a fluid lubricant supply or sump 11, a cylinder casing 12 mounted on the crank case, and a cylinder head 13 secured to said cylinder casing. Contained in suitable bores in the cylinder casing 12 are fluid compressing pistons 16 and 17, the piston 16 having at its upper side a compression chamber 18, which is connected with a discharge pipe 20 through a communication controlled by the usual discharge valve 21, as shown in Fig. 6, which is urged to the seated position by a spring 21a, while the piston 17 has associated therewith a similar compression chamber and discharge valve (not shown) controlling communication with said discharge pipe.

A crank shaft 22, which may be driven by any suitable means (not shown) is provided within the crank case 10 for operating the pistons. The crank shaft has end bearings 23 and 24 journaled in ball bearing assemblies 25 and 26, respectively, which are mounted in the crank case 10, and an intermediate bearing 28 journaled in a ball bearing assembly 29, which is mounted in an interior wall 30 of said crank case, as shown in Fig. 1. Associated with the crank shaft are connecting rods 32 and 33, which are operatively connected in the usual manner to the pistons 16 and 17, respectively, the connecting rod 32 being journaled on a crank pin 35 of the crank shaft, and the connecting rod 33 being journaled on a crank pin 36, said crank pins being spaced about 180° apart.

The cylinder casing 12 has formed thereon at one side of the bores therein valve casing portions 40 and 41, while the cylinder head 13 has extensions 43 and 44, which respectively correspond to and cap said valve portions. Contained in the casing portion 40 is an inlet valve 46, which is adapted to engage a seat 47 to control communication between a chamber 49, which is connected to the atmosphere by way of a passage 48, as is best shown in Fig. 6 of the drawings, and a chamber 50 above the valve which is connected by way of a port 51 with the chamber 18 above the piston 16.

The inlet valve 46 has a stem 52, which is slidably mounted in a suitable bore formed in the casing portion 40 and is connected to a piston 53 mounted in a bore in said casing portion and having at one side thereof a chamber 54 and at the other side a chamber 54a. A spring 55 is interposed between the inlet valve 46 and the lower wall of chamber 49 for urging the valve away from its seat, the piston 53 being adapted to operate said valve according to the pressure of fluid lubricant supplied to the chamber 54 in the manner hereinafter described.

In order to prevent the possible leakage of lubricant past the stem 52 into the chamber 49, said stem is provided with an annular groove 57 connected through a radial bore 58 and central bore 59 to the chamber 54a at the lower side of the piston 53, which chamber is connected to the crank case chamber by way of a drain passage 61 formed in the cylinder casing, so that oil leaking past the stem will flow into the groove 57 and thence through the radial bore 58 and the central bore 59 to chamber 54a and will drain from said chamber through passage 61 back to the crank case chamber.

Similarly, the casing portion 41 contains an inlet valve 63, which is adapted to engage a seat 64 and controls the admission of air from an inlet chamber 65, which is constantly connected to the atmosphere, to a chamber 66 which is connected by way of a port 67 to the compression chamber above the compressor piston 17. The inlet valve 63 is normally held unseated by a spring 70, and is adapted to be operated through the medium of a stem 71 by a lubricant pressure responsive piston 72 having at one side thereof a chamber 73, the stem 71 having an annular groove 74 formed therein and communicating by way of bores 76 and 77 with a chamber 73a below said piston, which communicates by way of a drain passage 78 with the crank case chamber.

For supplying fluid lubricant under pressure to the chambers 54 and 73 to operate the inlet valves and to lubricate the compressor, a combined lubricant pump and distributor device is provided. In the embodiment of my invention now being described, the lubricant pump is of the gear type, and comprises a gear 80 secured to the end of the crank shaft 22 by means of a key 81, and a gear 83 having an axial stud 84, one end of which is rotatably mounted in a suitable bore in the crank case 10, the other end being similarly mounted in a bore in a cover plate 85, which is secured to the end face of said crank case by bolts or other means (not shown).

The teeth of the gears 80 and 83 intermesh and are operative in the usual manner to draw lubricant from the supply 11, through an inlet passage 87 communicating with said supply adjacent the lowermost point therein, as is best shown in Figs. 1 and 3, to an inlet chamber 88 in the crank case, and to convey said lubricant to an outlet chamber 89. The outlet chamber is connected by way of a passage 90 with an annular chamber 91 surrounding the crank shaft 22 adjacent to one end, and thence through a passage 93 to the lowermost portion of a reservoir 94. The reservoir 94 is substantially leak tight and is preferably formed in a portion integral with the cylinder casing 12.

The crank shaft 22 has a radial bore 96 which communicates with the annular chamber 91, said bore being connected to a lubricant duct 97 leading through the crank shaft to a valve chamber 98 formed in a counterweight portion 100. The valve chamber 98 communicates through a passage 99 with the chamber within the crank case 10. Positioned in the valve chamber 98 is a ball valve 101, which is adapted to be forced to a seat surrounding the end of the passage 97 by centrifugal force upon rotation of the crank shaft at a predetermined speed, so that when the compressor is operating at a high speed, the valve 101 prevents flow of lubricant from the pump back to the crank case 10, thus permitting the pump to build up a pressure on the lubricant pumped.

In addition the duct 97 in the crank shaft communicates by way of branch ducts 97a with the bearing surfaces on the crank pins 35 and 36 so as to lubricate these surfaces.

The gear 80 is constructed and arranged to control the supply and release of lubricant under pressure to and from the chambers 54 and 73 on the faces of the pistons 53 and 72 for operating the inlet valves of the compressor. As shown in the drawings, the gear 80 has an annular cavity 105 formed in the inner face thereof and this cavity is adapted always to register with a port 106 formed in the crank case wall and communicating with the passage 93, while an arcuate cavity 107 is formed in the outer face of the gear 80 and communicates by way of a passage 108 extending through the gear 80 with said annular cavity 105. The arcuate cavity 107 is adapted to register with a port 111 in the cover plate 85 during the compression stroke of the piston 17, and with a port 112 in said cover plate during the compression stroke of the piston 16, the port 111 being connected through a pipe and passage 113 to the chamber 73 in the valve casing portion 41, and the port 112 being connected through a pipe and passage 114 to the chamber 54 in the casing portion 40.

An arcuate cavity 116 is also formed in the outer face of the gear 80 and is suitably spaced from the arcuate cavity 107 so as to register with the port 111 during the suction stroke of the piston 17 and with the port 112 during the suction stroke of the piston 16, this cavity being adapted to establish communication from either of said ports 111 and 112 through a passage 117 in the gear 80 and the crank shaft 22, and thence through a passage 118 in the cover plate 85 and crank case 10 to the crank case chamber and sump 11.

In operation, the crank shaft 22 is rotated in a clockwise direction, as viewed in Fig. 4 of the drawings, and the pistons 16 and 17 are thereby operated in the usual manner, one of said pistons moving in its suction stroke while the other moves in its compression stroke. At the same time, the gears 80 and 83 are operated by the crank shaft to draw fluid lubricant from the supply 11, through the passage 87 to the inlet chamber 88 and to deliver lubricant from the inlet chamber to the outlet chamber 89, from which lubricant is forced under pressure through the passage 90, cavity 91 and passage 93 to the reservoir 94. The volume of air trapped in the reservoir above the fluid lubricant therein ensures a substantially constant pressure in the lubricating system.

Fluid lubricant is also supplied from the passage 93 through the port 106 to the annular cavity 105 in the gear 80, and flows therefrom through the passage 108 to the arcuate cavity 107. As the gear 80 is rotated by the crank shaft 22 the cavity 107 is brought into registration with the port 111 upon each compression stroke of the piston 17 and into registration with the port 112 upon each compression stroke of the piston 16, so that lubricant is forced alternately through said ports into the conduits 113 and 114, charging said conduits and the respective piston chambers 73 and 54 connected thereto.

Lubricant supplied to the chamber 91 also flows by way of the passage 96 in the crank shaft 22 to the lubricant duct 97 therein, from which it is fed to the bearings by way of the branch ducts 97a.

While the compressor is operated at a speed less than a predetermined rate, as during the starting period, the lubricant forced through the lubricant system by operation of the gear pump, as hereinbefore described, is permitted to escape from the duct 97 of the crank shaft past the ball valve 101 to the chamber 98 and thence through the opening 99 to the crank case chamber, thus preventing normal build up of fluid pressure in the system. Consequently, during this period of operation, the pressure of the lubricant acting against the inlet valve pistons 53 and 72 is not sufficient to cause said pistons to close the inlet valves 46 and 63 against the pressures of the springs 55 and 70, respectively, so that the compressor remains unloaded. As the operative speed of the compressor is increased, the ball valve 101 is urged to its seat by centrifugal force and cuts off escape of lubricant from the lubricating system. Thereafter, the pressure in the lubricating system and in the reservoir 94 is rapidly built up by operation of the gear pump so that the pressure of lubricant is then sufficient to operate the compressor inlet valves.

When the compressor is in the position in which it is shown in Fig. 1 of the drawings, with the piston 16 about to operate in its suction stroke and the piston 17 about to operate in its compression stroke, the cavity 107 in the gear 80 is in registration with the port 111, while the cavity 116 in the gear 80 is in registration with the port 112, and lubricant under pressure supplied to the arcuate cavity 107 in the gear member 80 in the manner already described is forced therefrom through the port 111 to the conduit 113 and chamber 73 in the casing portion 41, thereby operating the piston 72 to move the inlet valve 63 into engagement with the seat 64 and compressing the spring 70. The piston 17 is then operated to compress air or other fluid in the compression chamber above the piston, the fluid under pressure being discharged past the discharge valve and through the pipe 20.

Meanwhile, the inlet valve 46 of the other cylinder of the compressor is maintained unseated by the spring 55, which acts through the medium of the valve and stem 52 to force the piston 53 upwardly, since lubricant contained in the chamber 54 and conduit 114 is relieved of fluid pressure as they are connected to the crank case chamber by way of the ports 112, the cavity 116, and the passages 117 and 118. On rotation of the crank shaft 22 the piston 16 is operated in its suction stroke to draw air or other fluid through the opening 48, the chamber 49, past the open inlet valve 46, to the chamber 50 and through passage 51 into the compression chamber 18.

It will be understood that, as the gears of the lubricant pump are turned when the crank shaft is rotated, the cavities 107 and 116 in the gear 80 are adapted, by reason of their arcuate form, to remain in registration with the ports 111 and 112 until the piston 16 has substantially completed the suction stroke and the piston 17 its compression stroke.

As rotation of the crank shaft 22 is then continued, the piston 16 will begin its compression stroke and the piston 17 will begin its suction stroke, while the gear 80 is turned to a position in which the cavity 107 no longer communicates with the port 111 but is in registration with the port 112, and the cavity 116 is moved out of registration with the port 112 and into registration with the port 111.

When the arcuate cavity 107 registers with the port 112 lubricant under pressure from the lubricating system flows by way of the pipe 114 to the chamber 54 and forces the piston 53 downwardly against the opposing force of the spring 55, thereby seating the inlet valve 46.

Similarly, with the port 111 connected to the cavity 116 in the gear 80, lubricant is released from the chamber 73 and the spring 70 is enabled to unseat the inlet valve 63, moving the stem 71 and piston 72 upwardly and discharging lubricant from the chamber 73 through passage and conduit 113, the connected ports 111 and 116, and passages 117 and 118, to the crank case chamber.

As already pointed out in connection with the suction stroke of the piston 16 and compression stroke of the piston 17, the connections between the arcuate cavity 116 and port 111 and between the arcuate cavity 107 and port 112 are maintained for a sufficient interval to ensure seating of the inlet valve 46 until the piston 16 has substantially completed its compression stroke, while permitting the inlet valve 63 to remain unseated during the suction stroke of the piston 17.

It will be understood that as operation of the compressor is continued, the cycle of operation as just described is repeated with every revolution of the crank shaft. In case of failure of the supply of lubricant under pressure, for any cause, the compressor will be automatically unloaded, the inlet valves 46 and 63 being maintained unseated by the springs 55 and 70, respectively.

Means are thus provided for operating the inlet valves of the compressor through the medium of the compressor lubricating system, it being apparent that said means may be adapted for use in a compressor having more than two cylinders by providing the proper ports in a lubricant pressure distributor such as the gear 80.

It will also be apparent that by modifying the exhaust valves of the compressor in accordance with my invention and suitably altering the construction and arrangement of the lubricant pressure distributor, the valve control means could be adapted to operate both the inlet and exhaust valves of said compressor.

Referring to Figs. 7 and 8 of the drawings, there is illustrated a modification of my invention associated with a compressor of the single cylinder type, which comprises a crank case 120, a cylinder casing 121 and a cylinder head 122, the crank case being closed at one end by a cover plate 123 and containing a lubricant supply 124. The crank case 120 is provided with a cylindrical bearing chamber 125 in which anti-friction bearings 126 are secured for supporting a rotatable shaft 127, which extends through an opening in a closure member 129 secured to the crank case. Any suitable means, such as bolts (not shown), may be provided for securing the several casing sections of the compressor together.

A piston 131 is reciprocably mounted in a bore in the cylinder casing 121 and has at its upper face a chamber 132, said piston being operable in the usual manner by the shaft 127 through the medium of a connecting rod 133, which is journaled on a crank pin 134 rigidly keyed to said shaft.

A discharge valve 135 is carried in a valve chamber 136 formed in an extension 137 of the cylinder head 122, said valve having a stem 138 which is guided in a bore in a cap 139 secured to said head and closing the chamber 136. A spring 140 is interposed between the cap and the discharge valve 135 for urging said valve toward a seat 141.

Disposed in a chamber 144 formed in an overhanging portion 145 of the cylinder casing 121 is an inlet valve 146, which is adapted to engage a seat 147 for controlling communication from an inlet pipe and chamber 148 and the chamber 144 which is connected with the compression chamber 132 by way of a passage 149.

The inlet valve 146 has a stem 152 which extends through suitable bores in the casing portion 145 and the cylinder casing 121 and into the crank case chamber. The lower end of the stem 152 is provided with a screw-threaded bore into which is screwed the end of the stem 153 of a piston 154, which is mounted to slide in a bore in a member 155 that is secured within the crank case 120 by means of screws 156, the piston 154 having a pressure chamber 157 at the upper side thereof, while the chamber at the lower side thereof is open to the crank case. A spring 158 is interposed between the outer wall of the member 155 and a spring seat 159 secured to the stem 153, and acts to urge the piston 154, the connected stems 153 and 152, and the inlet valve 146 upwardly, a shoulder 160 on the piston 154 normally engaging the wall of the chamber 157 for limiting upward movement of said elements by the spring 158.

The spring 158 is thus adapted to bias the inlet valve away from the seat 147, the degree of movement of the valve away from its seat being variable as desired by adjusting the screw-threaded ends of the stem 152 relative to that of the piston stem 153, while the stem 152 and the stem 153 may be secured in the adjusted position by tightening the lock nut 161 on the piston stem 153.

A fluid lubricant circulating pump is provided for supplying lubricant under pressure for lubricating the compressor and for operating the inlet valve through the medium of the piston 154. As shown in Fig. 7 of the drawings, the lubricant pump comprises a hollow piston 162 pivotally mounted on a crank pin 163, which is formed integral with the crank pin 134. The crank pin 163 is disposed eccentrically relative to the axis of the shaft 127 and is located on the side of this axis opposite the crank pin 134. The hollow piston 162 is adapted to reciprocate within a bore 164 in an oscillating member 165, one end 166 of which is journaled in the cylinder member 155, the opposite end 167 being journaled in a bearing portion 168 that is secured to the crank case 120. The bearing portion 168 has an intake opening 170 which is provided with a screen 171 and communicates, through a passage 172 in member 165 containing a ball check valve 173, with the bore 164 at the lower side of the hollow piston 163.

As is best shown in Fig. 8 of the drawings, the passage 172 communicates with a port 175, which registers with an arcuate cavity 176 formed in the cylinder member 155 adjacent the end bearing 166, and the cavity 176 is connected through a passage 177 with the piston chamber 157.

The hollow piston 162 has a central bore 178 connecting the bore 164 in the oscillating member 165 with a lubricant duct 179 formed through the crank pins 134 and 163. A ball valve 180, which is carried in the crank shaft counter-weight portion 181, is arranged to function in the same manner as the check valve 101 shown in Fig. 1, to control the pressure of the lubricant in the lubricating system, said valve 180 controlling the flow of lubricant from the duct 179 through the chamber and passage 182. Disposed in the bore 178 of the hollow piston 162 is a ball check valve 184, which is adapted to prevent back flow of lubricant from the bore 178 to the bore 164.

When the crank shaft 127 is rotated, the fluid compressing piston 131 is operated in the usual manner through the medium of the crank pin 134, while the hollow piston 162 is reciprocated within the oscillating member 165 by the crank pin 163. During each suction stroke of the piston 131, the piston 162 is moved in its upward stroke to draw lubricant from the supply 124 through the screen 171 and past the check valve 173 to the bore 164, the check valve 184 being seated. Upon the compression stroke of the piston 131, the hollow piston 162 is moved downwardly, so that lubricant is forced from the bore 164 through the passage 172, connected ports 175 and 176 and passage 177 to the chamber 157 lubricant also flows past the check valve 184 in the hollow piston 162 and thence through the bore 178 and duct 179, excess lubricant being discharged past the valve 180 while the compressor is operating at less than a predetermined speed.

So long as the valve 180 remains unseated, the pressure of the lubricant supplied to the piston chamber 157 is insufficient to move the piston 154 to compress the spring 158, and consequently the inlet valve 146 is maintained unseated and thereby effects unloading of the compressor.

As the crank shaft 127 is rotated with increased speed, the valve 180 is moved to its seat, so that the subsequent downward strokes of the piston 162 are effective to build up sufficient lubricant pressure in the chamber 157 to act on the piston 154 to overcome the pressure of the spring 158. Thereafter, upon the compression stroke of the piston 131, the piston 162 is moved downwardly, displacing more lubricant from the bore than can flow past the check valve 184 in said piston, and thereby forcing lubricant under pressure to the chamber 157. The quantity of lubricant displaced by the piston 162 on its downward stroke is substantially in excess of that displaced by the piston 154, and the lubricant thus forced into the chamber 157 moves the latter piston downwardly against the force of the spring 158, so as to move the inlet valve 146 into engagement with the seat 147. As the inlet valve is thus moved to its seated position, the piston 131 is operated to compress fluid in the chamber 132, the fluid under pressure being discharged therefrom by way of the passage 149, chamber 144 and past the discharge valve 135.

The compression of fluid in chamber 132 continues until the piston 131 reaches the upper limit of its stroke, while the pressure of lubricant acting on the piston 154 maintains the inlet valve 146 seated, aided by fluid pressure in the valve chamber 144 acting on the top surface of said valve. On further rotation of the crank shaft the piston 131 is moved downwardly and the hollow piston 162 is moved upwardly, thereby relieving the piston 154 of lubricant pressure so as to permit the spring 158 to unseat the inlet valve 146 for again establishing communication from the inlet chamber 148 to the compression chamber 132.

This cycle of operation takes place on each subsequent revolution of the crank shaft as operation of the compressor is continued. From the foregoing it will be understood that in the last described embodiment of my invention, the spring 158 is adapted to maintain the inlet valve 146 unseated in case of failure of the lubricant supply, thereby unloading the compressor.

It will thus be seen that the invention provides improved inlet valve means for a compressor of either the single stage or multi-cylinder type, together with means cooperating with a pressure lubricating system to unload the compressor during operation thereof at a low speed, and to effect properly timed operation of said inlet valve means during operation of the compressor at a higher speed.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid compressor, in combination, an inlet valve, a pressure lubricating system for said compressor, yielding means for biasing said inlet valve open, pressure actuated means operable for closing said inlet valve, and means associated with said lubricating system and operated according to the speed of the compressor to periodically supply and release lubricant under pressure to and from said pressure actuated means for alternately opening and closing said inlet valve in timed relation to operation of the compressor.

2. In a fluid compressor having a plurality of fluid compressing pistons and a crank shaft for operating said pistons; in combination, a pressure lubricating system for the compressor including a pump; inlet valve mechanisms associated with each of said pistons, each of said mechanisms comprising a valve element, a spring for biasing said valve element open and a movable abutment operative by lubricant at a predetermined pressure for closing said valve element; distributing means operative by the crank shaft for establishing communication from said system sequentially to the movable abutment of each inlet valve mechanism upon the compression stroke of the piston associated therewith; and means for preventing build up of the predetermined pressure in the lubricating system while the compressor is operated at less than a given speed.

3. In a compressor having one or more fluid compressing pistons and a crank shaft operatively connected thereto, in combination, an inlet valve associated with each piston, liquid pressure operated means for controlling each inlet valve, a gear pump operated by the crank shaft for supplying liquid under pressure to a supply passage and comprising a pair of operatively engaging gears, one of said gears having in one face thereof a first port always communicating with said supply passage and a second port always communicating with a pressure-relief passage, and one or more passages, each communicating with one of said liquid pressure operated means and adapted alternately to register for a predetermined time with each of said ports during operation of said gear, whereby liquid is alternately supplied to and released from said liquid pressure operated means for controlling the inlet valve or valves of the compressor.

4. In a fluid compressor having a crank case and a compression cylinder, in combination, an inlet valve for the cylinder having a stem, a piston connected to said stem and subject to the pressure of fluid lubricant in a chamber, means for varying the pressure of lubricant in said chamber for operating the piston to open and close said inlet valve, and means for preventing leakage of lubricant from said chamber past the stem to the inlet valve, comprising an annular groove in the stem connected to an interior bore in said stem and communicating through a drain passage with the crank case chamber.

5. The combination with a crank shaft, a cylinder, and a piston slidably mounted in said cylinder and operatively connected to said crank shaft, of an inlet valve controlling the supply of fluid to said cylinder, liquid pressure actuated means for operating said inlet valve, a fluid pressure reservoir, a gear pump operated by the crank shaft for supplying liquid under pressure to said reservoir and comprising a pair of operatively engaging gears, one of said gears having in one face thereof a first port always communicating with said reservoir and a second port always communicating with a pressure-relief passage, and a passage communicating with said liquid pressure actuated means and adapted alternately to register for a predetermined time with each of said ports during operation of said gear, whereby liquid is alternately supplied to and released from said liquid pressure actuated means for operating said inlet valve in timed relation to movement of said piston.

6. The combination with a crankshaft, a cylinder, and a piston slidably mounted in said cylinder and operatively connected to said crankshaft, of an inlet valve controlling the supply of fluid to said cylinder, liquid pressure actuated means for operating said inlet valve, means for maintaining a substantially constant supply of liquid under pressure in a supply passage, rotary slide valve means operative by said crankshaft and having a supply port always communicating with said supply passage and a relief port always communicating with a pressure release passage, and a passage communicating with said liquid pressure actuated means and adapted alternately to register for a predetermined time with each of said ports during operation of said rotary valve means, whereby liquid is alternately supplied to and released from said liquid pressure actuated means for operating said inlet valve in timed relation to movement of said piston.

7. In a compressor having one or more fluid compressing pistons and a crankshaft operatively connected thereto, in combination, an inlet valve associated with each piston, liquid pressure operated means for controlling the inlet valves, a chamber adapted to contain a liquid, means operative by said crankshaft for pumping liquid under pressure from said chamber to a supply passage, and distributing means for alternately supplying and releasing liquid under pressure to and from said liquid pressure operated means for controlling the inlet valve or valves of the compressor, said distributing means comprising a rotary valve operative by the crankshaft and having a supply port always communicating with said supply passage and a pressure-relief port always communicating with said chamber, said ports being adapted alternately to communicate for predetermined intervals with the liquid pressure operated means of each inlet valve in sequence during operation of the compressor.

BURTON S. AIKMAN.